United States Patent

Seguin et al.

[11] Patent Number: 6,123,114
[45] Date of Patent: Sep. 26, 2000

[54] FLEXIBLE PIPE FOR RISER IN OFF-SHORE OIL PRODUCTION

[75] Inventors: Bruno Roger Seguin, Nîmes; René Antoine Maloberti, Champigny sur Marne, both of France

[73] Assignee: Coflexip, France

[21] Appl. No.: 09/213,575

[22] Filed: Dec. 17, 1998

[30] Foreign Application Priority Data

Feb. 18, 1998 [FR] France ................................. 98 01969

[51] Int. Cl.⁷ .................................................. F16L 11/08
[52] U.S. Cl. ........................ 138/124; 138/130; 138/134; 138/133
[58] Field of Search .................................. 138/135, 131, 138/143, 134, 140, 137, 138, 174

[56] References Cited

U.S. PATENT DOCUMENTS

| 4,344,462 | 8/1982 | Aubert et al. | 138/131 X |
| 4,403,631 | 9/1983 | Abdullaev et al. | 138/130 |
| 5,269,349 | 12/1993 | Sugier et al. | 138/131 X |
| 5,275,209 | 1/1994 | Sugier et al. | 138/135 |
| 5,406,984 | 4/1995 | Sugier et al. | 138/135 |
| 5,645,109 | 7/1997 | Herrero et al. | 138/134 |
| 5,669,420 | 9/1997 | Herrero et al. | 138/135 |
| 5,813,439 | 9/1998 | Herrero et al. | 138/135 X |
| 5,934,335 | 8/1999 | Hardy | 138/135 |

FOREIGN PATENT DOCUMENTS

| 2557254 | 6/1985 | France . |
| 2619193 | 2/1989 | France . |
| 3440459 | 5/1986 | Germany . |
| 92/00481 | 1/1992 | WIPO . |

OTHER PUBLICATIONS

"Recommended Practic for Flexible Pipe", API Recommended Practice 17B (RP 17B) First Edition, Jun. 1, 1988, pp. 2–37.

Primary Examiner—Patrick Brinson
Attorney, Agent, or Firm—Ostrolenk, Faber, Gerb & Soffen, LLP

[57] ABSTRACT

It is of the unbonded type and comprises, from the inside outwards, an internal leakproof assembly comprising a pressure vault, a first inner group of tensile armor (5), a second outer group of tensile armor (7) and an external sealing sheath (8), the tensile armor of the said inner and outer groups being wound at a lay angle of less than 55°, characterized in that an intermediate sealing sheath (6) is inserted between the two inner (5) and outer (7), groups of tensile armor, the inner group of tensile armor (5) being wound with a short pitch and at a lay angle of greater than 35° and less than 55°, and the outer group of tensile armor (7) being wound with a long pitch and with a lay angle of less than 30°.

11 Claims, 5 Drawing Sheets

FIG_1

FIG_2

FIG_3

FLEXIBLE PIPE FOR RISER IN OFF-SHORE OIL PRODUCTION

BACKGROUND OF THE INVENTION

The present invention relates to a hybrid structure for a flexible pipe constituting a riser in off-shore oil production and designed for the transportation of effluent under pressure. The structure according to the present invention is particularly well suited to flexible pipes of the riser type, that is to say to flexible pipes paid out from a surface installation such as a platform and which are connected to the underwater installations and the greater part of which do not rest on the seabed. Such flexible pipes operate in a dynamic situation unlike the flexible pipes which are laid on the seabed and known as flow lines, which work essentially in a static situation.

The flexible pipes or risers which connect the surface installations to the seabed equipment such as a well head or manifold have varying configurations such as, for example, those represented in "Recommended Practice for Flexible Pipe" API 17B, Jan. 6, 1988 edition.

Flexible pipes designed to be used in fairly shallow or moderately shallow water (typically between 100 and 800 m) have structures which can vary widely, depending on the conditions of use.

The flexible pipes most widely used in oil production are generally of the unbonded type, in which the various successive and distinct layers have a certain freedom to move with respect to each other, and they comprise, from the inside outwards, a carcass consisting, for example, of an interlocked metal strip which serves to prevent the pipe from being crushed under the external pressure, an internal sealing pressure sheath made of polymer, a pressure vault consisting of at least one interlocked shaped wire wound into a short-pitch spiral at almost 90°, so-called tensile armor whose lay angle, measured along the longitudinal axis of the pipe, is less than 55° and an external sealing sheath made of polymer. Such a flexible pipe whose innermost element consists of a carcass is called rough-bore.

When a flexible pipe comprises, from the inside outwards, an internal sealing sheath, a pressure vault consisting of interlocked shaped wires wound with a short pitch and intended to withstand the hoop stresses caused by the flow of effluent through the flexible pipe, an anti-collapse sheath, one or more tension and pressure armors wound around the anti-collapse sheath and an external sealing sheath made of polymer, such a flexible pipe because the innermost element is a smooth-walled leakproof sheath is called a smooth-bore.

The elements which make up these various structures are defined in documents API 17B and 17J of the document recalled above.

In an alternative form, the flexible pipe has no pressure vault and the layers of reinforcement are spiral-wound with reverse pitch at lay angles of close to 55°. In this case, the internal and external pressures and the tensile forces are exerted or supported by these layers of reinforcement; such a flexible pipe is said to be balanced.

Examples of structures of flexible pipes are described, for example, in FR-A-2,619,193 and FR-A-2,557,254.

Proposed in FR-A-2,619,193 is a flexible pipe whose dimensional variations, particularly in the axial direction, can be controlled in such a way that dimensional stability or controlled shortening can be achieved when the internal pressure is raised.

In FR-A-2,557,254, the flexible pipe is designed not to exhibit an appreciable variation in length when subjected to an internal pressure with a "direct bottom effect" which is induced by the pressure within the flexible pipe.

Described in DE-A-34,40,459 is a flexible pipe which, in particular, comprises a sealed internal assembly and layers of tensile armor. However, there is just one group of tensile armor with a sealing sheath arranged around a winding which could constitute a pressure vault, as is described, in particular, in the API documents 17B and 17J recalled above.

Described in U.S. Pat. No. 4,403,631 is a flexible pipe comprising, from the inside outwards, an internal sealing sheath, a pressure vault consisting of one or more windings of a wire of appropriate cross section, an anti-collapse sheath, several layers of tensile armor and an external sealing sheath. In one embodiment, the lay angle of the winding of the pressure vault being a short pitch angle, for example between 60 and 85°, whereas the lay angle of the tensile armor is between 0 and 20°. In another embodiment, the lay angle of the tensile armor is between 75 and 90°.

In this last document, the sheath arranged between the pressure vault and the first layer of tensile armor is, as is usually the case in the type of pipe described, an anti-collapse sheath. It cannot in any way be seen as being an intermediate sheath arranged between groups of tensile armor.

In the flexible pipes currently available, the reinforcements are designed to withstand all the loadings they experience during manufacture, transportation, laying, service and recovery.

When the pipes are intended to transport gas alone, or gas associated with liquids, particularly liquid hydrocarbons or two-phase mixtures, it has been proposed that, in order to evacuate the gas which necessarily diffuses through the various elements that make up the flexible pipe, the external coating be made relatively permeable in the emerged part of the flexible pipe, either by the use of holes or by choosing a material which has higher permeability to the gas than does the material of the internal tube. It is also known practice for areas of weakness to be produced in the external covering, particularly grooves or holes which are not open but form places where bursting can occur in the event of overpressure, thus offering a preferred passage through which the gas can escape (bursting discs). In patent FR-A-2,553,859, it is described that a leakage flow be achieved using a recess made in an end fitting with which the pipe is equipped and which communicates with the annular space outside the group of reinforcements armor.

EP 0,341,144 describes a flexible pipe in which there is formed a duct which places the external annular region in communication with the outside environment, the said duct opening, on the one hand, between the external sealing sheath and the uppermost reinforcing armor layer and, on the other hand, into a valve which works on differential pressure.

Irrespective of the type of flexible pipe used to form a riser between seabed equipment and surface equipment, the said flexible pipe progresses through the water in a controlled way so that, up to where it connects with the seabed equipment, hydrostatic equilibrium is obtained within the said flexible pipe.

After the flexible pipe has been connected to the seabed equipment, the flexible pipe is subjected to external loadings which may be classified into two main categories.

The first category essentially consists of tensile stresses which develop, on the one hand, at the connection between the top end of the flexible pipe and the surface equipment and, on the other hand, before and after the buoyancy means that are arranged along the said pipe.

The second category consists of the stresses developed while the flexible pipe is in use, that is to say while effluent is being transported or while the flexible pipe is empty, which corresponds to a shutdown of the flow of effluent (pipe empty). In both instances there is an internal pressure $P_{int}$ exerted inside the flexible pipe and an external pressure $P_{ext}$ exerted outside the pipe.

When the difference $\Delta P=(P_{int}-P_{ext})$ is positive, the stresses induced in the flexible pipe are radial and longitudinal, the two stresses being considered as positive because they are directed towards the outside of the pipe. The radial stress leads to a radial expansion, while the longitudinal stress leads to a lengthening of the flexible pipe.

When the difference $\Delta P=(P_{int}-P_{ext})$ is negative, the stresses are considered as being negative because they are directed towards the inside of the pipe. The radial stress leads to a compression and the longitudinal stress leads to a shortening of the said flexible pipe.

The longitudinal stresses in both instances where the difference $\Delta P$ is positive or negative are tensile stresses.

The end cap effect T induced in a flexible pipe depends, among other things, on the pressure difference $\Delta P=(P_{int}-P_{ext})$ and on the internal and external radii of the said pipe.

When T is positive, the end cap effect is said to be a direct end cap effect.

When T is negative, the end cap effect is said to be a reverse end cap effect.

Down to a certain depth, the reverse end cap effect has little damaging effect on the flexible pipe, and this is true regardless of the negative value of $\Delta P$.

Beyond a certain depth, the reverse end cap effect may have severe consequences which may lead to damage to the flexible pipe. Thus, that part of the flexible pipe that is situated at a depth of, for example, between 1250 m and 3000 m may be subjected to the reverse end cap effect when the difference $\Delta P$ is highly negative, it being possible for the said end cap effect locally to induce a plastic deformation of the reinforcement filaments which may lead to irreversible damage to the flexible pipe.

Furthermore, when the external sheath bursts for whatever reason, the pressure in the annulus increases and becomes equal to the external pressure exerted on the flexible pipe. At a depth of 1500 m, the external pressure exerted on the submerged part of the flexible pipe at this depth is equal to about 150 bar and the reinforcements experiencing this external pressure tend to twist.

SUMMARY OF THE INVENTION

The object of the present invention is to propose a new structure for a flexible pipe which makes it possible to effectively counter the reverse end cap effect.

The subject of the present invention is a flexible pipe of the unbonded type and comprising, from the inside outwards, an internal leakproof assembly comprising a pressure vault, a first, inner, group of tensile armor, a second, outer, group of tensile armor and an external sealing sheath, the tensile armor of the said inner and outer groups being wound at a lay angle of less than 55°, characterized in that an intermediate sealing sheath is inserted between the two, inner and outer, groups of tensile armor, the inner group of tensile armor being wound with a short pitch and at a lay angle of greater than 35° and less than 55°, and the outer group of tensile armor being wound with a long pitch and with a lay angle of less than 30°.

Depending on the type of flexible pipe, the internal leakproof assembly consists of an internal carcass (roughbore), an internal sealing sheath and a pressure vault, or of an internal sealing sheath and a pressure vault (smoothbore).

One advantage of the present invention lies in the fact that the flexible pipe is well able to withstand the reverse end cap effect and that this is true even though, on the one hand, the anti-collapse sheath has been removed in a flexible pipe whose innermost element consists of a smooth-walled sealed internal sheath and, on the other hand, the reinforcing fabric tape usually arranged directly under the external sealing sheath has been removed. In fact, there is produced a flexible pipe with two essentially concentric annuli—an inner annulus and an outer annulus—each comprising specific elements.

An annulus is the space that lies between two leakproof concentric tubular sheaths. The inner annulus is delimited by the sheath internal sealing sheath and the intermediate sealing sheath and comprises the pressure vault and the inner group of tensile armor, while the outer annulus is delimited by the intermediate sealing sheath and the external sealing sheath and comprises the outer group of tensile armor.

In a flexible pipe in which the innermost element consists of a carcass according to the invention, the structure is the same as the one described above except that the carcass is arranged under the inner annulus, that is to say under the internal sealing sheath.

When, following some accident, the external sealing sheath is damaged, the external pressure exerted on that part of the flexible pipe that lies at a depth of 1800 m, for example, may reach about 180 bar; this pressure is transmitted through the outer annulus and to the intermediate sealing sheath, which causes the latter to be pressed against the inner group of tensile armor. However, since the intermediate sealing sheath constitutes a sealing barrier for the inner group of tensile armor, the water which has entered the outer annulus is not diffused into the inner annulus, and this prevents the layers of reinforcements that constitute the said inner group of reinforcements from inflating and undergoing "birdcage" deformation. This is because the water pressure exerted on the external face of the intermediate sealing sheath balances the compressive forces induced on the other face of the said intermediate sealing sheath. In consequence, the outer group of reinforcements cannot undergo "birdcage" deformation because it is held in place by the internal structure.

According to another feature of the present invention, the difference between the lay angles of the inner and outer groups of tensile armor is greater than 5° and is preferably between 10 and 15°.

According to another feature of the present invention, the gas or gases present in the effluent and diffusing through the internal sealing sheath are drained towards one surface end fitting of the flexible pipe as soon as they reach the inner annulus. Thus, they do not diffuse or they diffuse very little through the intermediate sealing sheath, and this prevents damage to the outer group of tensile armor.

Thus, the outer annulus, which lies between the intermediate sealing sheath and the external sealing sheath is dry, as far as the gas is concerned.

BRIEF DESCRIPTION OF THE DRAWINGS

Other advantages and features will emerge more clearly from reading about a preferred embodiment of the invention, and from the appended drawings, which.

DESCRIPTION OF THE EMBODIMENT

Figure 1:
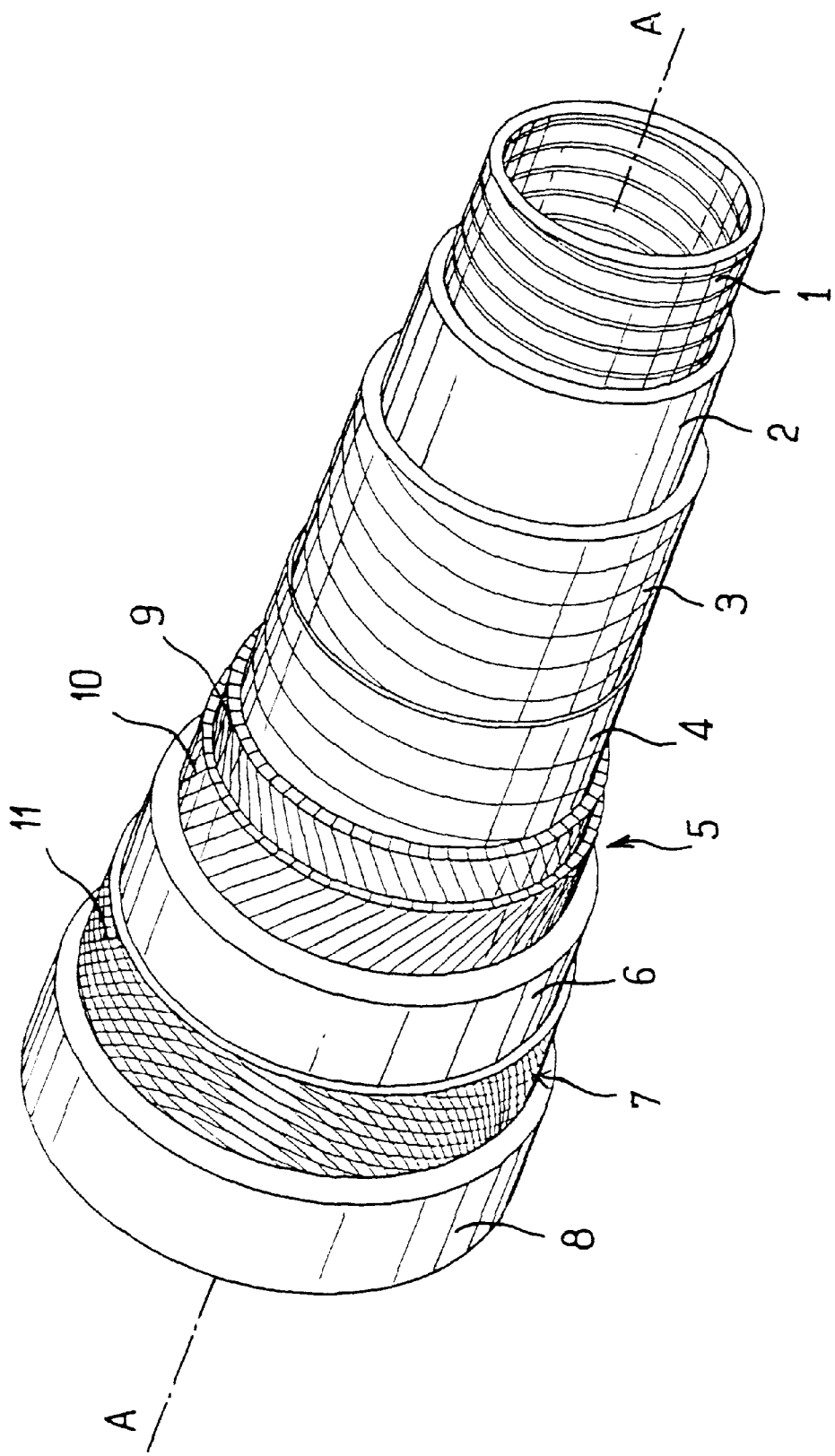
FIG. 1 is a partial cut-away perspective view of a flexible pipe according to a first embodiment of the invention, of the type of flexible pipe in which the innermost element consists of a carcass.

According to a first embodiment (FIG. 1), the flexible pipe is of the type in which the innermost element consists of a carcass and it comprises, from the inside outwards, a metallic carcass 1, an internal sealing sheath 2, made of a polymeric material, for example, a pressure vault 3, a helical steel armor 4 consisting of a short-pitch winding of a rectangular-section wire the thickness of which varies from one use to another, an inner group of tensile armor 5, an intermediate sealing sheath 6, for example polymeric, an outer group of tensile armor 7 and an external sealing sheath 8, also made of a polymeric material.

The wrapper 4 is not always used and is only of benefit when the production well is at high pressure, because it helps to reinforce the pressure vault to allow it to effectively withstand the hoop stress.

The pressure vault 3 consists, for example, of a helical winding of a interlocked shaped wire around the internal sealing sheath 2, the helix angle formed by the winding being close to 90° with respect to the longitudinal axis A of the said pipe. The winding of the pressure vault 3 may constitute what is commonly known as a group of tensile armor that withstand the circumferential component of the pressure even if it is a single layer of winding.

The fact that an intermediate sealing sheath 6 is inserted between the two groups of tensile armor 5 and 7 has, surprisingly and unexpectedly, revealed that the flexible pipe according to the invention had a considerable ability to withstand the reverse end cap effect. Thus, despite the tearing of the external sealing sheath 8 and the application of an external pressure in excess of 100 bar, the outer group of tensile armor 7 did not undergo "birdcage" deformation and the radial expansion of the groups of tensile armor 5 and 7 remained within acceptable limits.

According to the present invention, the first inner group of tensile armor 5 preferably consists of two layers of tensile armor 9 and 10, wound in opposite directions in a short-pitch helical winding, the lay angle of which, defined with respect to the longitudinal axis A of the pipe, is less than 55° but greater than 35° and is preferably between 35° and 45°. These layers of tensile armor 9 and 10 are intended mainly to withstand the longitudinal or axial components of the pressures outside and inside the flexible pipe, even though they play a part in withstanding the other stresses which develop within the flexible pipe. Of course, the said layers of tensile armor 9 and 10 will be designed and produced from appropriate materials to ensure that they work correctly depending on the effluent that is to flow through the said flexible pipe and depending on the depth of water in which it is submerged.

As long as the flexible pipe is full of a fluid such as the effluent flowing inside it, the only stresses applied to the pipe are radial or hoop stresses which are reacted by the pressure vault 3, and the tensile stresses that are due to a lengthening or shortening of the said pipe, which are reacted by the layers of tensile armor 9 and 10. Now, the fact that the first layer of reinforcements is wound at a moderate pitch makes this layer able to withstand the said tensile stresses. With a lay angle of 35° and preferably less than 45° it is possible to be sure that the tensile stresses developed by the combined effects of the internal and external pressures when the flexible pipe is in service will be borne, almost in their entirety, by the layers of tensile armor 9 and 10.

To ensure that the other tensile stresses which are developed when laying the pipe, such as the weight, do not have to be borne in their entirety by the layers of tensile armor 9 and 10, the present invention recommends that the outer group of tensile armor 7 be produced in such a way that it takes up some part of the said other tensile stresses. For this, the second, outer, group of tensile armor 7 consists of at least one long-pitch helical winding, the lay angle of which is less than 30°.

In the embodiment of FIG. 1, the outer group of tensile armor 7 consists of a braid 11 made, for example, using carbon filaments.

Figure 2:
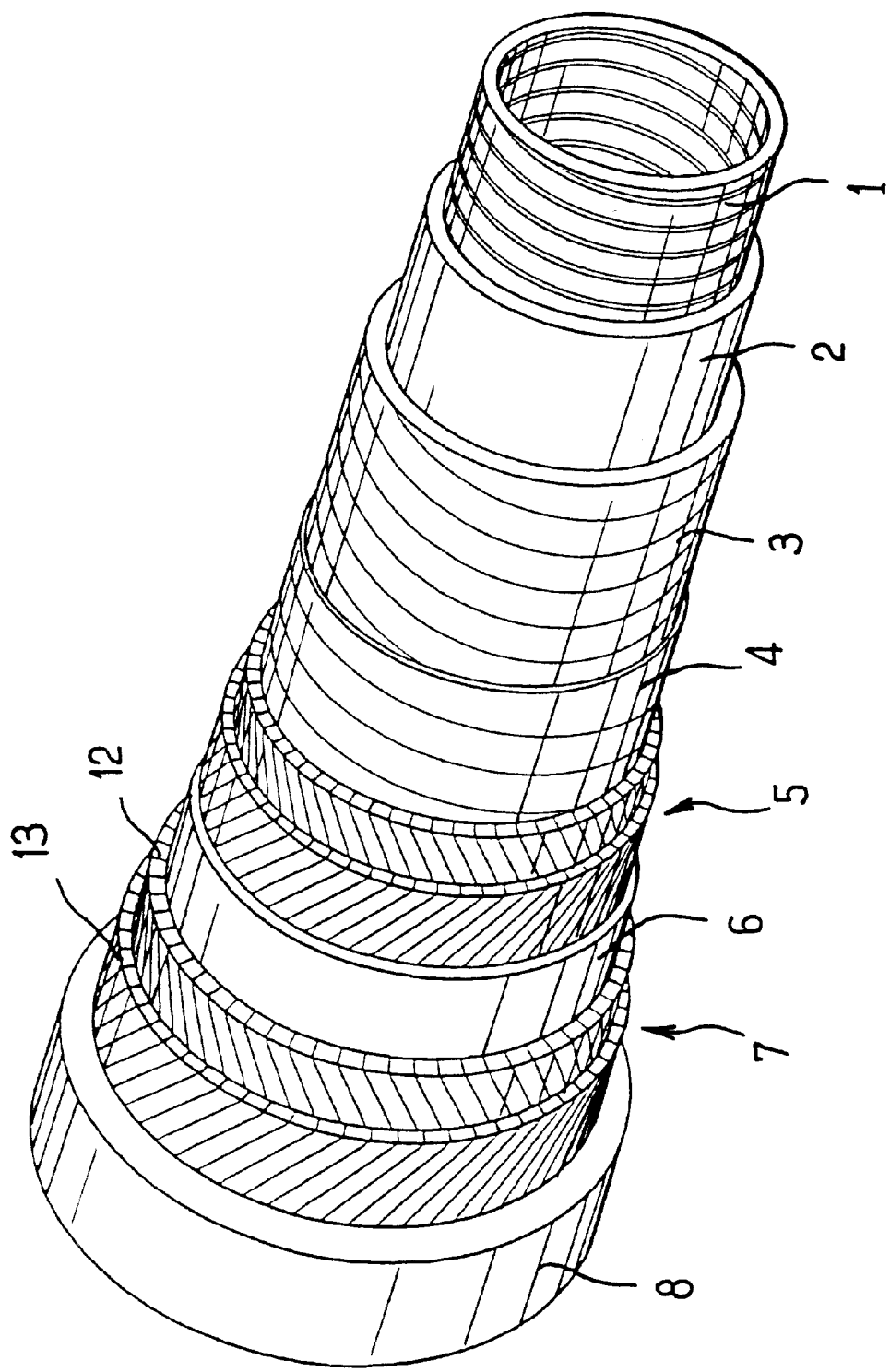
FIG. 2 is a view similar to the view of FIG. 1, but according to another alternative form of the first embodiment.

In the embodiment of FIG. 2, the outer group of tensile armor 7 consists of two layers of reinforcements 12 and 13 which are wound in opposite directions with a long pitch and the lay angle of each of which is less than 30° and is preferably between 15 and 30°. The direction in which the layer 12 is wound is preferably, but not necessarily, the same direction as the direction in which the layer 9 of the inner group of tensile armor 5 is wound, whereas the direction of winding of the layer 13 is the same as that of the layer 10.

Figure 3:
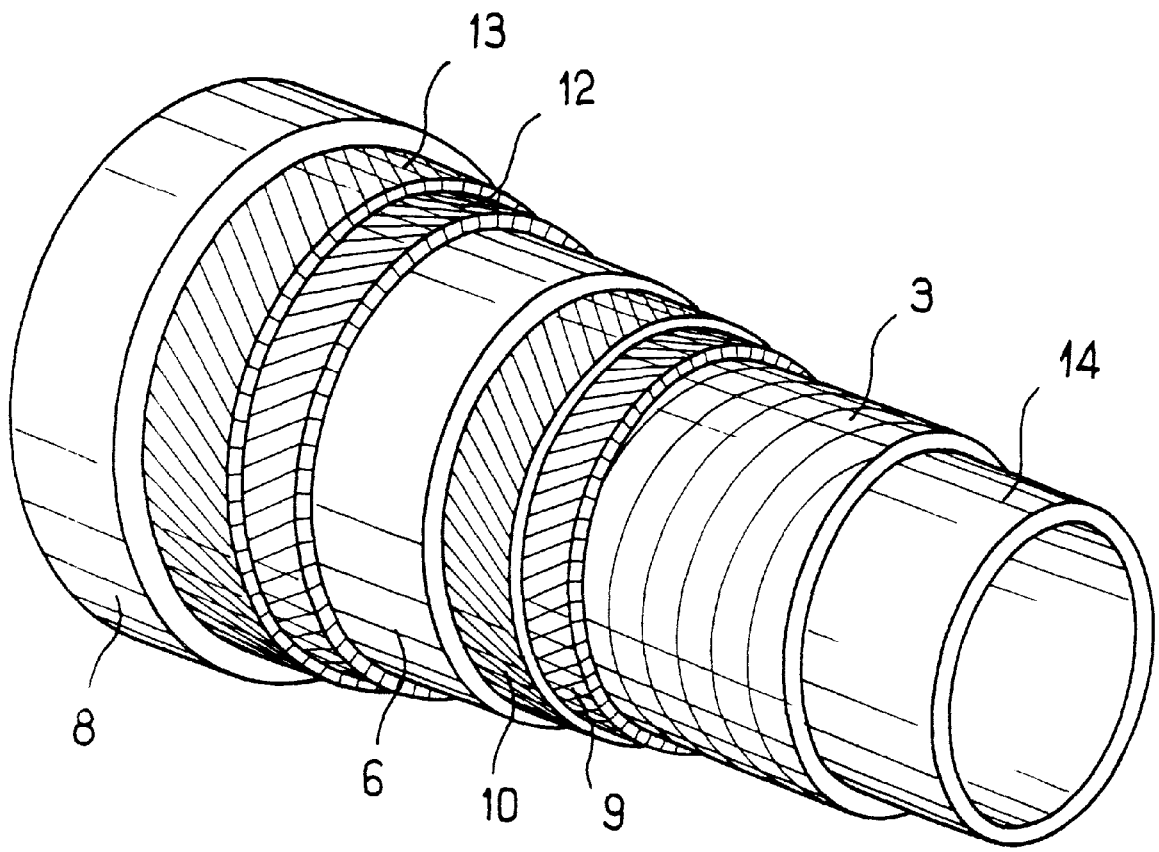
FIG. 3 is a partial cut-away perspective view of a flexible pipe according to a second embodiment of the invention, of the type of flexible pipe in which the innermost element consists of a smooth-walled sealing sheath.

In another embodiment depicted in FIG. 3, the flexible pipe is of the type in which the innermost element consists of a smooth-walled sealing sheath and it comprises, from the inside outwards, an internal sheath 14, the pressure vault 3, the inner group of tensile armor 5 which consists of the two layers of reinforcements 9, 10, the intermediate sealing sheath 6, the outer group of tensile armor 7 which consists of the two layers of reinforcements 12 and 13, and finally the external sealing sheath 8.

The lay angle of each layer of tensile armor of the two, inner 5 and outer 7, groups is less than 55°.

Figure 4:
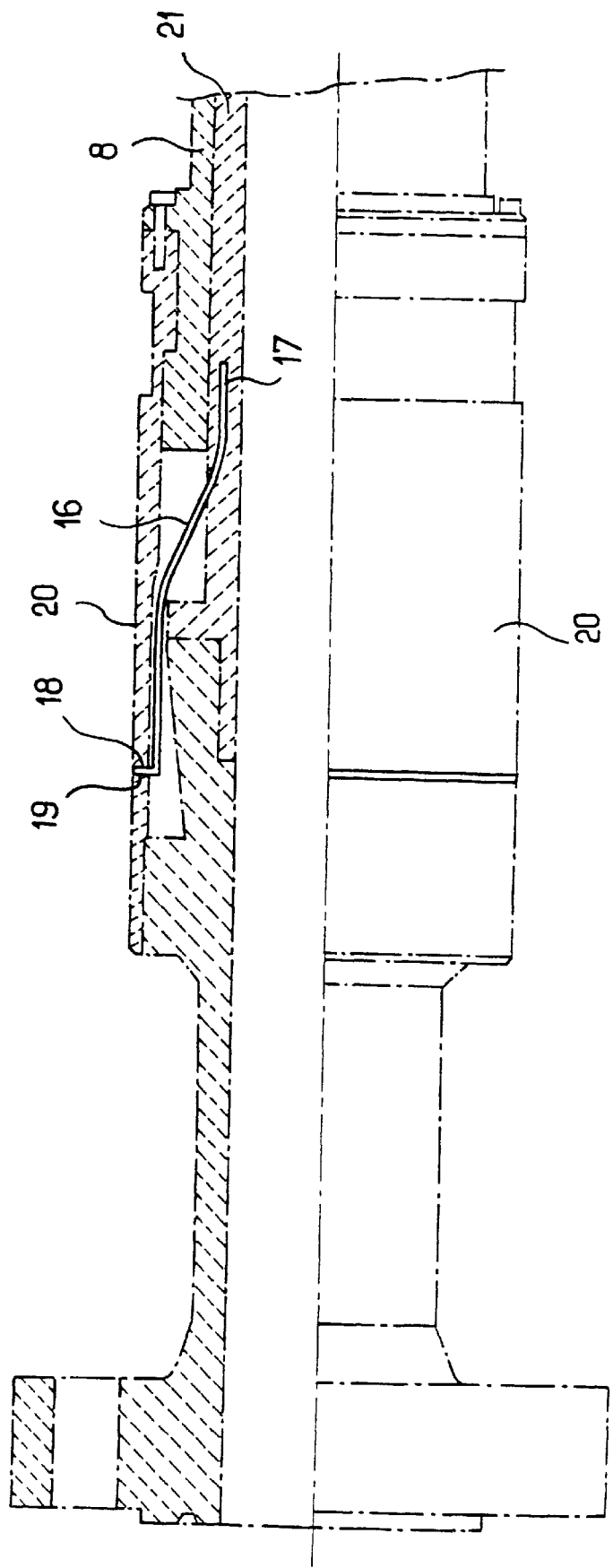
FIG. 4 is a diagrammatic partial sectioned view of the flexible pipe equipped with an end fitting.

According to another feature of the invention, the system for draining the gases (FIG. 4) consists of a duct 16, one end 17 of which is inserted between the layers of tensile armor 9 and 10 of the inner group of tensile armor 5, and the other end 18 of which opens to the open air through an orifice 19 formed in the terminal surface end fitting 20 of the flexible pipe. In FIG. 4 which is highly simplified and diagrammatic, the reference 21 denotes the assembly that is made up of all the elements located under the external sealing sheath 8, the said assembly particularly comprising the layers of tensile armor 9 and 10 of the group of reinforcements 5, between which layers the end 17 of the drainage duct 16 opens.

The gases present in the two-phase effluent flowing through the flexible pipe are diffused through the internal sheath 2 or 14, the pressure vault 3 and the layers of tensile armor 9 and 10 of the group of reinforcements 5, and rise towards the terminal surface end fitting 20. As the drainage duct opens between the layers of tensile armor 9 and 10, the gases will be drained out through the said drainage duct 16 in the same way as if the drainage duct were to open just underneath the external sealing sheath, as is explained in application EP 0,341,144. However, in the flexible pipe described hereinabove, the presence of a valve is not necessary but there is nothing to stop one being provided if desired, whether or not this be a differential-pressure valve.

Furthermore, the gases do not diffuse or diffuse very little through the sealed intermediate sheath 6. This is because, since the inner annulus communicates with the atmosphere, it is therefore at atmospheric pressure and the pressure of the gases exerted on the intermediate sealing sheath 6 is very low, of the order of one bar, the gases having no reason to diffuse through the intermediate sealing sheath 6 because they can escape through the orifice 19.

As the gases are drained in the inner annulus, the risk of the outer annulus becoming inflated is greatly reduced and the risk of the external sealing sheath being damaged by the gases is practically zero.

Figure 5:
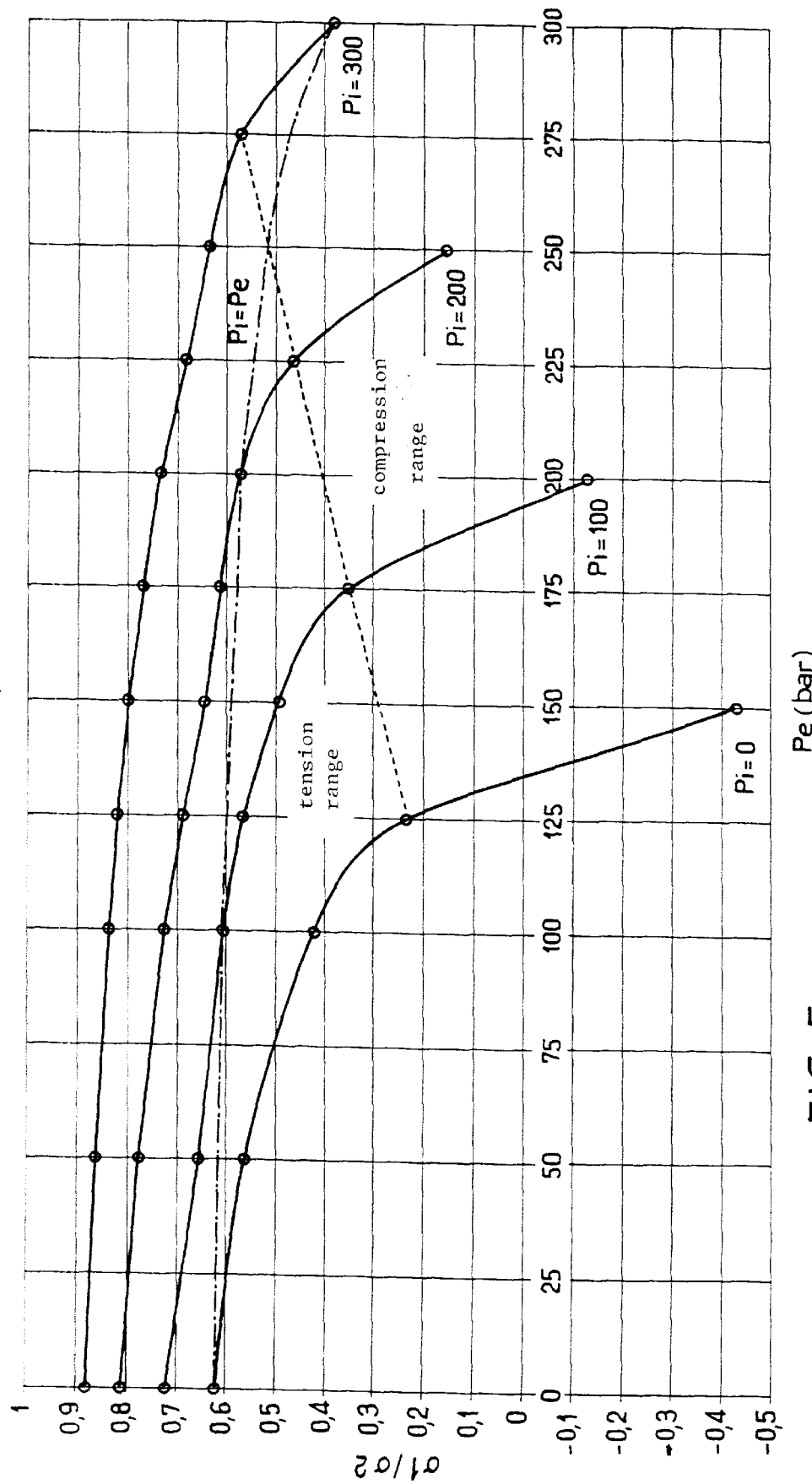
FIG. 5 is a graphical representation of the ratio $\sigma_1/\sigma_2$ as a function of the external pressure for given internal pressures.

When a simulation of the behavior of a flexible pipe according to the invention is desired, curves representing the change in ratio $\sigma_1/\sigma_2$ as a function of the external pressure $P_{ext}$ for the various values of internal pressure $P_{int}$ are established (FIG. 5).

Simplifying the calculations, the ratio $\sigma_1/\sigma_2$ can be validly represented by the following expression:

$$\frac{\sigma_1}{\sigma_2} = \frac{E_1 \cdot \cos^2 \alpha_1}{E_2 \cdot \cos^2 \alpha_2} = \left[\frac{1 + k \cdot \tan^2 \alpha_1}{1 + k \cdot \tan^2 \alpha_2}\right]$$

In this expression:
- $\sigma_1$ is the tensile stress in the layers of tensile armor 9 and 10,
- $\sigma_2$ is the tensile stress in the layers of tensile armor 12 and 13,
- $E_1$ is the elastic modulus of the material of the layers of tensile armor 9 and 10 which are assumed to have been made from the same material,
- $E_2$ is the elastic modulus of the material of the layers of tensile armor 12 and 13 which are assumed to have been made from the same material,
- $\alpha_1$ is the lay angle of the layers of tensile armor 9 and 10,
- $\alpha_2$ is the lay angle of the layers of tensile armor 12 and 13,
- k is a number which depends on the lay angles and stiffnesses $E_i e_i$ of the pressure vault and of the inner and outer groups of tensile armor, $e_i$ being the equivalent thickness of the layer i in question.

An analysis of the curves of FIG. 5 shows that when $P_{int}=P_{ext}$, then the flexible pipe is subjected to practically no compression, irrespective of the depth of water, the said flexible pipe being subjected mainly to tensile stresses. As soon as the absolute value of the difference $\Delta P$ is equal to or greater than 100 bar, then the compressive range may start from a depth of 1250 m for a value of the ratio $\sigma_1/\sigma_2$ equal to about 0.23.

Preferably, the stiffness $e_2 E_2$ of the outer group of tensile armor 7 is greater than the $e_1 E_1$ of the inner group of tension reinforcement 5, the ratio $e_2 E_2/e_1 E_1$ of the said stiffnesses being greater than 1, and preferably being between 1 and 4. Besides carbon, materials that are suitable for producing the outer group of reinforcements include a polyaramid or any other material with a high elastic modulus.

What is claimed is:

1. A flexible pipe of the unbonded type comprising, from the radial inside outward:

an internal leak proof assembly comprising an internal carcass, a pressure vault around the carcass, a first inner group of tensile armor being wound at a lay angle of less than 55° around the pressure vault, an intermediate sealing sheath around the first inner group of tensile armor, a second outer group of tensile armor also being wound at a lay angle of less than 55° and the intermediate sealing sheath is between the inner and the outer groups of tensile armor;

each of the first inner and second outer groups of tensile armor comprises at least two layers of reinforcements wound in opposite directions;

and the respective lay angles of the first inner and the second outer groups of tensile armor differ from each other by more than 5°;

and an external sealing sheath around the second outer group of tensile armor.

2. The flexible pipe of claim 1, wherein the first inner group of tensile armor is wound with a relatively shorter pitch and at a lay angle of between 35° and 55°; and the second outer group of tensile armor is wound with a relatively longer pitch and with a lay angle of less than 30°.

3. The flexible pipe of claim 1, wherein the lay angles of the first inner and second outer groups of tensile armor differ in the range between 10° and 15°.

4. The flexible pipe of claim 1, wherein the second outer group of tensile armor comprises a winding of a carbon filament.

5. The flexible pipe of claim 1, wherein the second outer group of tensile armor comprises a braid of carbon filaments.

6. The flexible pipe of claim 1, wherein the material for the second outer group of tensile armor has a greater stiffness than the stiffness of the material of the first inner group of tensile armor.

7. The flexible pipe of claim 6, wherein the ratio between the stiffnesses of the groups of tensile armor is greater than 1.

8. The flexible pipe of claim 6, wherein the ratio between the stiffnesses of the groups of tensile armor is in the range of 1 to 4.

9. The flexible pipe of claim 1, further comprising at least one drainage duct for draining gases, the duct having one end which opens outwardly and having another end which emerges between the two layers of reinforcement of the first inner tensile armor.

10. The flexible pipe of claim 1, further comprising an internal sealing sheath, and an inner annulus which radially inwardly is defined by the internal sealing sheath and radially outwardly by the intermediate sealing sheath.

11. The flexible pipe of claim 1, further comprising an outer annulus defined radially outwardly by the external sealing sheath and radially inwardly the intermediate sealing sheath.

* * * * *